(12) United States Patent
Wambeke et al.

(10) Patent No.: US 6,504,986 B1
(45) Date of Patent: Jan. 7, 2003

(54) OPTICAL FIBER ASSEMBLY

(75) Inventors: Alain Wambeke, Zoutleeuw (BE); Erik Peeters, Heverlee (BE)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/600,743

(22) PCT Filed: Jan. 5, 1999

(86) PCT No.: PCT/GB99/00023
§ 371 (c)(1),
(2), (4) Date: Jul. 20, 2000

(87) PCT Pub. No.: WO99/38042
PCT Pub. Date: Jul. 29, 1999

(30) Foreign Application Priority Data

Jan. 21, 1998 (GB) .............................................. 9801198

(51) Int. Cl.⁷ ................................................. G02B 6/00
(52) U.S. Cl. ...................................................... 385/134
(58) Field of Search .................................. 385/134–137

(56) References Cited

U.S. PATENT DOCUMENTS

| | | | |
|---|---|---|---|
| 4,840,449 A | 6/1989 | Ghandeharizadeh | 350/96.2 |
| 5,100,221 A | 3/1992 | Carney et al. | 385/135 |
| 5,613,030 A * | 3/1997 | Hoffer et al. | 385/135 |
| 5,946,440 A * | 8/1999 | Puetz | 385/135 |
| 6,061,492 A * | 5/2000 | Strause et al. | 385/135 |
| 6,304,707 B1 * | 10/2001 | Daems et al. | 385/135 |

FOREIGN PATENT DOCUMENTS

| | | | |
|---|---|---|---|
| DE | 34 42 429 A | 5/1986 | G02B/6/44 |
| EP | 3530162 | 4/1987 | G02B/6/44 |
| EP | 0408266 | 1/1991 | G02B/6/36 |
| EP | 0 529 830 A | 3/1993 | G02B/6/44 |
| EP | 0 557 187 A1 | 8/1993 | G02B/6/44 |
| WO | 95 29418 A | 11/1995 | G02B/6/46 |

* cited by examiner

Primary Examiner—Khiem Nguyen
(74) Attorney, Agent, or Firm—Allen, Dyer, Doppelt, Milbrath & Gilchrist, P.A.

(57) ABSTRACT

A kit for forming an optical fiber assembly includes a plurality of panels to be stacked together including a base panel and at least one further panel. Each panel includes a body with an opening therein, and an edge extending upwards from the body. A plurality of connector-retainers are carried by the body and extend beyond the edge for securing optical fiber connectors therein. The kit further includes a stacking member arranged for stacking the plurality of panels together so that the plurality of connector-retainers in a respective panel project into the opening in an adjacent panel while allowing the adjacent panel to rest on the edge of the respective panel.

27 Claims, 6 Drawing Sheets

OPTICAL FIBER ASSEMBLY

FIELD OF THE INVENTION

This invention relates to a kit of parts for forming a fiber optic assembly, comprising a stack of two or more panels each of which is provided with retaining means for securing connectors for optical fibers, to an assembly comprising the panels and the installed connectors, and to a method of making the assembly. In particular, the invention relates to a kit of parts, and formed assembly, suitable for use as a stack of patch panels in a closure, a cabinet, a sub-rack or other container, for example in a patching shelf of the exchange rack in a telecommunications network.

BACKGROUND OF THE INVENTION

The process of connecting one length of optical fiber to another by means of an intermediate length of optical fiber is known in the art as "patching". The intermediate lengths of optical fiber are generally in the form of pigtails, and the pigtails are generally held on a panel, known as a "patch panel", to secure them, and for protection. A pigtail is an optical fiber which is pre-terminated at one or both ends, for easy insertion into a connector. Where the optical fiber is terminated at only one end, the other end is left free for splicing to a main length of optical fiber. A major advantage of using intermediate lengths of optical fiber in the form of pigtails, on a patch panel to join main lengths of fiber; is that it is possible to move or interchange connections between optical fibers in order to modify a network, without handling the main lengths of cable. This reduces the risk of damage to the main lengths of fiber. The short pigtail sections can easily be replaced, if damaged.

The use of two or more stacking patch panels, e.g. in a sub-rack, and the use of two or more stacking splice trays in a closure are known. WO-A-95/29418 (Raychem Limited) describes a plurality of patch panel trays, that are hinged together along their rear edges to allow access to each tray. Each tray has a lip extending around its periphery, and is provided with a row of upstanding projections for retaining eight connectors therebetween. Each tray rests on the lip of the adjacent tray. The row of connectors extends from the rear to the front of the tray, but neither the connectors nor the upstanding projections project in height above the height of the lip around each panel. The patch panel trays of WO-A-95/29418 are intended to be used in groups which are mounted in a frame or support. The support may be a drawer in which the trays are hinged, and the drawer itself may be slideably mounted in a shelf in a rack.

The shelf and rack support arrangement as described in WO-A-95/29418 is a typical arrangement in telecommunications networks. The shelves and racks are usually a standard size, and therefore there are dimensional limitations on the size of each panel, and for any given height of panel, on the number of panels that can be stacked one above the other in the shelves and racks.

SUMMARY OF THE INVENTION

EP 0 557 187 (A) and U.S. Pat. No. 5,363,466 disclose an optical fiber assembly comprising a stack of flat modules, each of which is hingedly connected to a support. The modules are arranged to receive and hold optical fiber connections.

We have invented a new kit of parts for forming an optical fiber assembly, an assembly so formed, and a method of making the assembly, which allows an increased number of fiber optic connectors to be stored in a stack of panels, without increasing the overall size of the stack. In other words, increased capacity is achieved, without increased volume.

A first aspect of the present invention provides a kit of parts for forming an optical fiber assembly, the kit comprising:

a) two or more panels, including a base panel and one or more further panels, each panel having a body and an upstanding edge, and b) stacking means for stacking the panels, which assembly is characterised in that each of the panels has a plurality of connector-retaining means for securing optical fiber connectors, which connector-retaining means extend beyond the upstanding edge, in that each of the panels has an opening or recess in its body, and in that the stacking means are arranged for stacking the panels such that the connector-retaining means of each panel project into the opening or recess in the adjacent panel thus allowing the adjacent panel to rest on the upstanding edge.

Another aspect of the invention provides the assembled kit of parts. Thus a second aspect of the invention provides an optical fiber assembly comprising two or more panels, including a base panel and one or more further panels, each panel having a body and an upstanding edge, and a stacking means for stacking the panel, in that each of the panels has a plurality of connector-retaining means for securing optical fiber connectors, which connector-retaing means extend beyond the upstanding edge, characterised in that each of the panels has an opening or recess in its body, and in that the stacking means are arranged for stacking the panels such that the connector-retaining means of each panel project into the opening or recess in the adjacent panel, thus allowing the adjacent panel to rest on the upstanding edge.

Although the present invention envisages that the stack of panels could comprise only two panels, usually there would be more panels. A particularly preferred embodiment uses six panels.

The present invention refers to a base panel, and further panels on the base panel. These will usually be above the base panel. However they could be below the base panel, or the base and further panels may be on their sides. For convenience in this specification, reference may be made to orientations such as above, below, up, down, etc. These will be made with reference to a base panel beneath further panels. It will be appreciated that other orientations are possible, and encompassed by this invention. It is the relative positions of the panels that is important, and the term "base panel" is used to designate the starting point panel, wherever it may be (above, below, to the side) relative to the further panels.

The connector-retaining means in each panel are offset laterally (i.e., in the plane of each panel) relative to the connector-retaining means in the adjacent panel. The openings or recesses in each panel will usually also be similarly offset.

In a preferred embodiment the connector-retaining means comprise projections, e.g., projecting stubs. These project upwards from the plane of each panel, and are of such a height, that when the panels are stacked they project through the opening in the adjacent panel. The base panel, where it is beneath the further panels, has no projecting connector. retaining means attempting to project through it, and therefore it need not contain an opening. However, it may do so, and this may be preferred to minimize inventory. Also, as mentioned above, the base panel may be above the further panels, and the connector retaining means may project downwards rather than upwards from the plane of each panel.

The connector-retaining means are preferably arranged to be of such a height that they are slightly higher than a connector, when inserted.

In other embodiments, the connector-retaining means may comprise an adapter which fits between the projections to enhance retention of the connectors. One design of adapter is in the shape of a double open ended box, having one dimension, in cross-section, longer than the other. The adapter fits, preferably with the aid of spring clips, between the retaining projections. The adapter is shaped to fit around a standard, known, connector, which has a correspondingly rectangular cross-section. Preferably the adapter is arranged so that its shorter dimension, in cross-section, extends in the plane of each panel.

In preferred embodiments, each panel comprises a lip around, or near its edge, and when the panels are stacked, each panel is preferably arranged to rest on the lip of the adjacent panel. In these embodiments, when the connector-retaining means are in the form of projections, the projections on any particular panel preferably extend to a height greater than the height of the lip of that panel.

Each panel is preferably generally rectilinear having a rear edge, a front edge, and side edges, and the connector-retaining means preferably extend across the panel from the rear edge to the front edge in a substantially straight line. The line of connector-retaining means preferably extends substantially parallel to the side edges of the substantially rectilinear panel. Other configurations, e.g., a line of connector retaining means extending diagonally across the panel, or in random configuration are also possible, provided they are offset relative to those in the adjacent panel, and arranged to project into the opening in the adjacent panel. If necessary, more than one opening may be provided in the panels to accommodate the projecting connector-retaining means. The generally rectilinear panel may have rounded corners.

In a particularly preferred embodiment, each panel is substantially rectilinear, with a straight line of connector-retaining means extending from the rear to from face of the panel to one side of the panel, i.e., not through the center of the panel. The opening in the adjacent panel is an elongate opening corresponding to the position of the line of connector-retaining means in the lower panel, in order to accommodate the portions which project through it.

It is especially preferred for each of the further panels, and optionally also the base panel, in the stack to be substantially the same size, and preferably to be substantially identical. For example, they may be as described in the preceding paragraph, each panel being rotated 180° relative to its neighbor, so that the projecting connector-retaining means in each panel align with the openings in the adjacent panel. Panels in layers 1,3,5, etc. of the stack will be identically aligned. Similarly panels in layers 2,4,6 etc. of the stack will be identically aligned. The use of substantially identical panels minimizes. inventory.

In the kit of parts according to the invention, the means for stacking the panels may comprise interlocking parts on each panel which engage the adjacent panel, or it may comprise a separate member, which itself engages each of the panels. Preferably the means for stacking the panels, whether on each panel, or a separate member, comprises one or more hinges. When the panels are substantially rectilinear, the panels are preferably hinged along their rear edges.

The formed assembly according to the invention may also comprise fiber optic connectors retained in at least some of the connector-retaining means. In this case, not only the connector-retaining means, but also part of the connectors themselves, may project through the opening in the adjacent panel. Whether or not this occurs depends on the type of connector used.

Certain connectors that are typically used in patch panels are, in cross-section, longer in one dimension than in the perpendicular direction. In prior art arrangements, on patch panels, these connectors have traditionally been arranged so that the longer dimension extends in the plane of the panel. With this arrangement it was possible to arrange eight connectors across each panel, and to stack together six panels to fit in a standard shelf in a rack. With the present invention, it is possible to use those same connectors and the same sized panels, but to arrange the connectors so that their longer dimension extends substantially perpendicular to the plane of the panel. By doing this it is possible to fit twelve connectors across each panel. Although the height of each connector is now increased, the height of each panel does not need to be increased, since the projecting part of the connector projects into the plane of the neighbouring panel. Therefore, even with the new arrangement, it is still possible to fit six panels together in the shelf in the rack. Thus the capacity of the six panel stack is increased from 48 (eight in each panel) in the prior art to 72 (twelve in each panel) in the present invention, without altering the overall size of the stack. Furthermore, standard components, e.g., the same connectors, may be used.

In certain embodiments according to the invention, modular panels are used. For example, a main body portion may be pre-installed with connector retaining means, and add-on modules such as splicing spools, or islands for pigtail storage and bend control, may be fitted to the main body portion. Advantageously the modules may be a snap fit together.

The invention also provides a method of forming an optical fiber assembly comprising:
  a) providing two or more panels, each panel having a body and an upstanding edge, and
  b) stacking the panels, characterised in that
    each of the panels has a plurality of connector-retaining means for securing optical fiber connectors, which connector-retaining means extend beyond the upstanding edge, in that
    each of the panels has an opening or recess in its body, and in that the stacking is carried out such that the connector-retaining means of each
    panel project into the opening or recess in the adjacent panel.

BRIEF DESCRIPTION OF THE DRAWINGS

Embodiments of the invention will now be described, by way of example, with reference to the accompanying drawings, wherein.

DETAILED DESCRIPTION OF THE PREFERRED EMBODIMENTS

Figure 1:
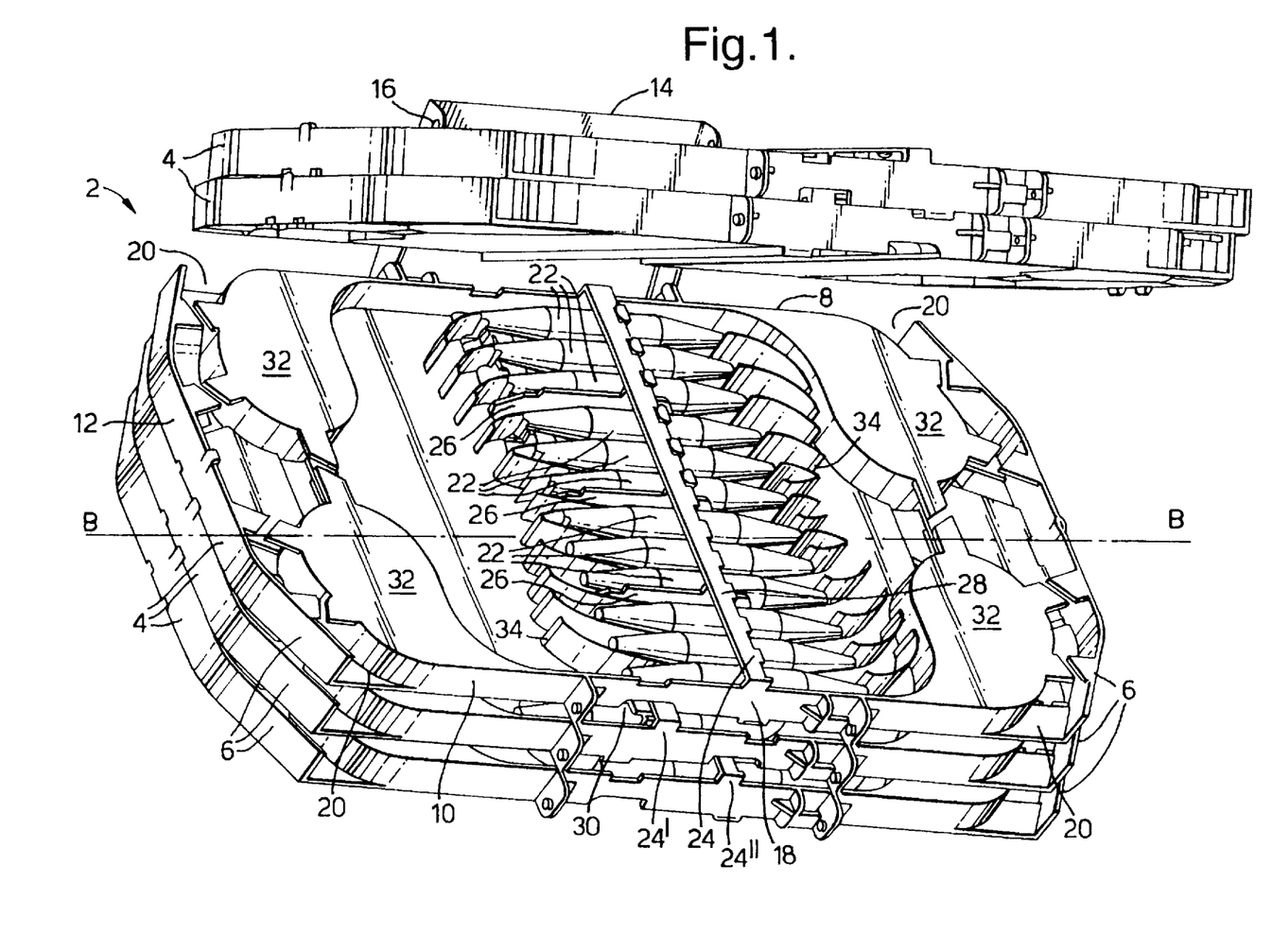
FIG. 1 is a perspective view of a first embodiment of a stack of patch panels according to the present invention.
Figure 2:
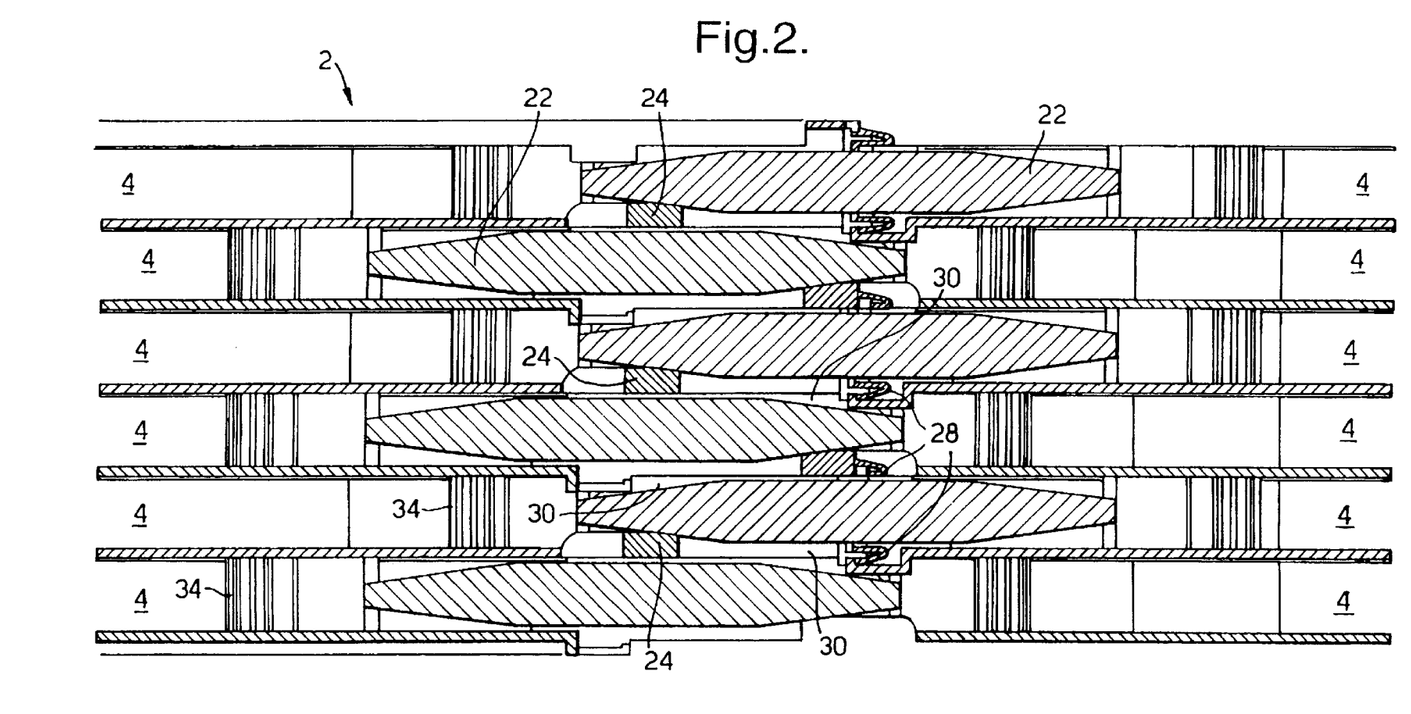
FIG. 2 is a cross-sectional view, taken along the line B—B of FIG. 1.

Referring now to the drawings, FIGS. 1 and 2 show a stack 2 of patch panels 4. Six panels are in the stack, as seen in FIG. 2. Only five panes are shown in FIG. 1 for clarity. Each panel 4 is substantially rectilinear, having rounded corners 6, a rear edge 8, a front edge 10, and side edges 12. A separate back plate 14 is provided, to which each of panels 4 is hinged. The back plate 14 acts as a means for stacking the panels 4 relative to each other, and for fixing their relative positions. The back plate 14 contains recesses 16, which can engage corresponding sections in the panels to detachably secure each panel in place. Each panel 4 has a lip 18 extending around its edge. It extends substantially entirely around the entire panel edge, except for four gaps 20, which are open to allow entry or exit of optical fibers. Two openings 20 are in the front face 10 (one on the right and one on the left of the front face 10), and two openings are in the rear face 8 (one on the right and one on the left of the rear face 8) of each panel 4. This means that there is both front and rear access to the panel, and front and rear patching are possible.

Twelve connectors 22 extend in a row across each patch panel 4. They extend in a substantially straight line from the rear face 8 to the front face 10. They are retained in place by connector retaining means in the form of a strip 24, from which depend three dividing strips 26. The dividing strips 26 divide the connectors 22 into four groups of three connectors. Also individual retaining means in the form of small hooks 28, secure to the strip 24, and separate each of the twelve connectors 22 from each other, retaining each securely in place. The retaining strip 24, and individual retainers 28 extend in height above the height of the lip 12 around each panel 4. This is required in order firmly to secure the connectors 22.

Retaining strip 24 extends from the rear face 8 to the front face 10 of the panel 4 in a direction substantially parallel to the side faces 12 of the panel 4, but displaced to one side of the panel 4. In the panel, the whole surface of which is visible in FIG. 1, the strip 24 is displaced to the right of the panel. As can be seen also in FIG. 1, the corresponding strip 24' in the panel below the visible panel in FIG. 1 is displaced a similar distance to the left of the panel, while the corresponding strip 24'' in the next panel below is aligned with the strip 24. Thus the retaining strips are staggered in alternate layers of the stack 2 of panels 4.

Each panel 4 is provided with an opening 30 through which the retaining strip 24, and retaining hooks 28 project. Thus although the retaining strip and hooks 24, 28, extend above the height of the lip surrounding each panel 4, adjacent panels 4 can nonetheless rest on the lip of the neighboring panel 4, since the additional projecting height is accommodated in the opening 30 of the neighboring panel. The staggered positioning of the retaining strips 24 and hooks 28 in adjacent panels, and the consequential staggering of the openings 30 in neighbouring panels mean that each projecting retaining means is accommodated in an opening. In the embodiment of FIGS. 1 and 2, each of panels 4 is identical, except that adjacent panels are rotated through 180° relative to each other. The use of identical panels in this way minimizes inventory.

Each panel 4 is also provided with islands 32, for fiber storage and bend control for fiber entering and exiting the panels 4, and curved sections 34 adjacent connectors 22, to provide bend control for fibers entering the connectors 22.

Figure 3:
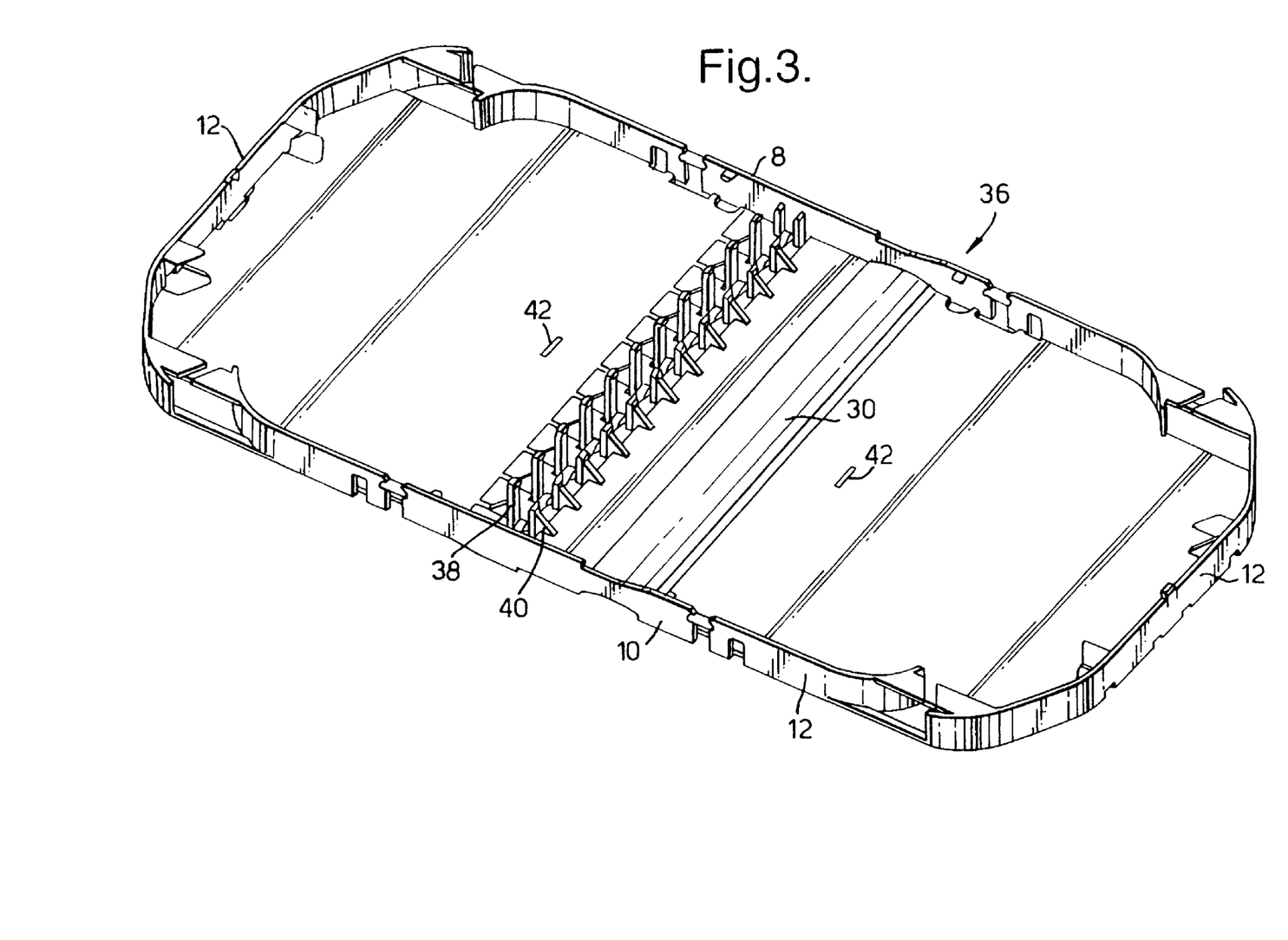
FIGS. 3, 4 and 5 are perspective views of three components which may be used together to form a patch panel for use in a second embodiment of a stack of patch panels according to the present invention.
Figure 4:
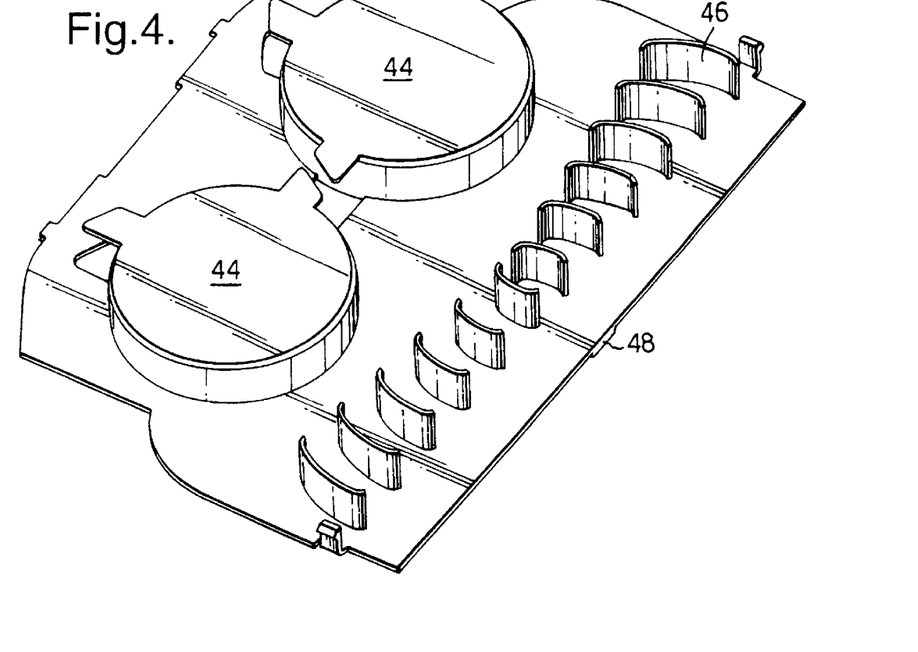
Figure 5:
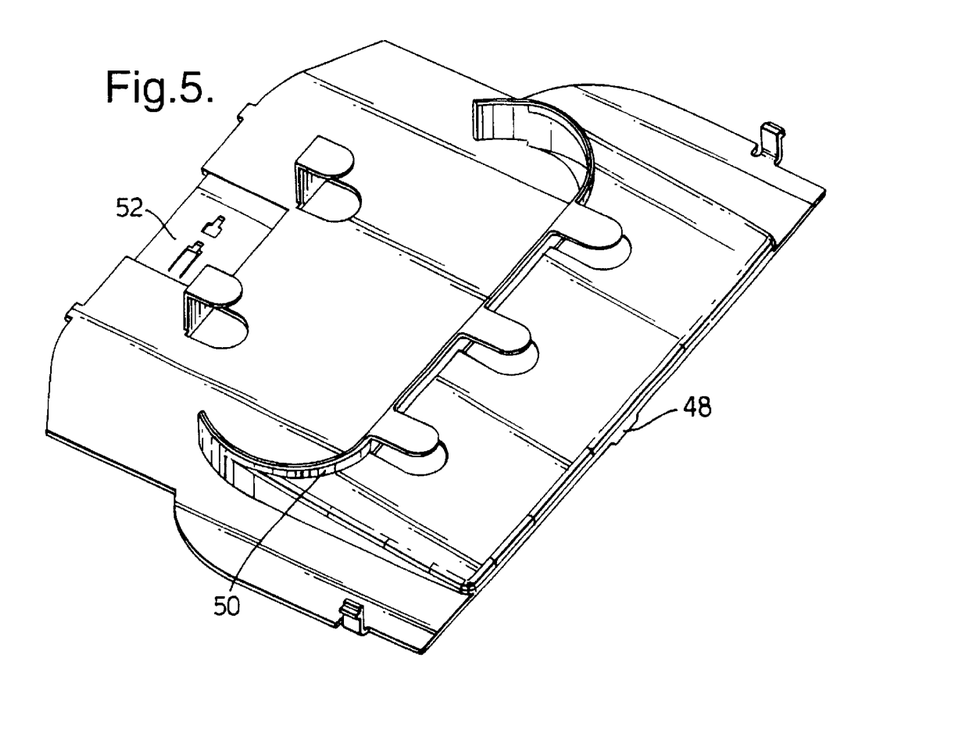

FIGS. 3 to 5 show three component parts of a modular version of a patch panel for use in the present invention. Like parts, corresponding to parts of the embodiments of FIGS. 1 and 2 are given like reference numerals. FIG. 3 shows the main body 36 of a patch panel. It is generally rectilinear with rounded corners as in the embodiment of FIG. 1. It comprises a straight row of connector-retaining means in the form of rows of projections 38 and 40. These may also act to retain a connector receiving adapter, as described later with reference to FIG. 7. The body portion 36 of the patch panel also comprises slots 42 for clipping on the modular components of FIGS. 4 and 5.

FIG. 4 shows a clip on module comprising islands 44 for bend control and fiber storage, and bend control curves 46 for fiber entering the connectors. The module comprises a snap fit connector section 48 for engaging the slot 42 in the main body part of FIG. 3. The module of FIG. 4 would be particularly suitable for handling pigtails entering the connectors.

FIG. 5 shows a clip on splice module comprising splice storage means 50, and space for a splicing module 52. As before the module comprises a snap fit connector section 48 for engaging the slot 42 in the main body part of FIG. 3.

Figure 6:
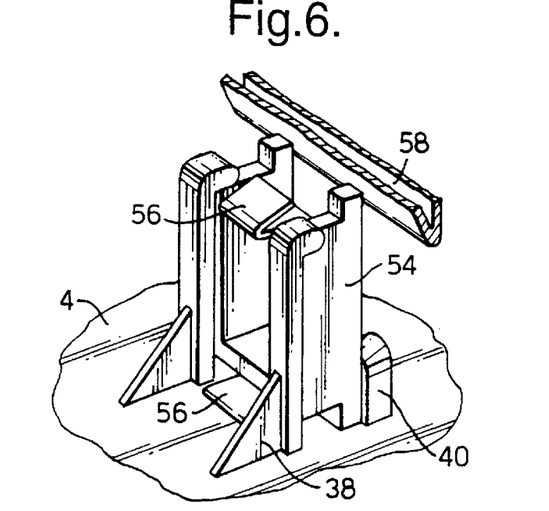
FIG. 6 is a perspective view of an adapter which can be used in conjunction with the part of FIG. 3, to secure optical fiber connectors to the patch panel.
Figure 7:
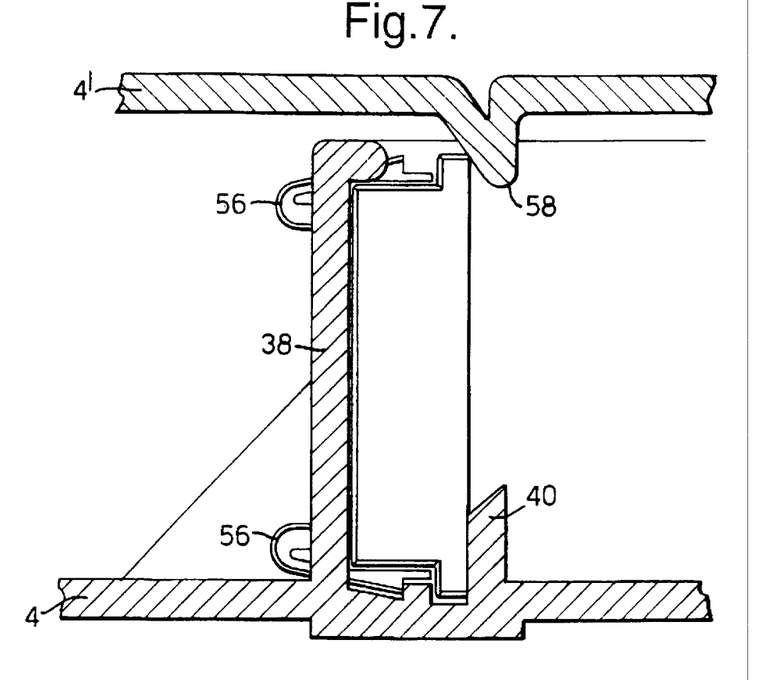
FIG. 7 is a side sectional view taken through one of the connector-retaining projections of FIG. 6.

FIGS. 6 and 7 show an adapter that can be used with the module of FIG. 3 to act as a further retaining means for the connectors. The adapter 54 is shaped as a double open ended box and fits between adjacent retaining projections 38 and 40. It is further retained in place by retaining clips 56, and by a retaining shoulder 58 from the neighboring panel 4'. The adapter 54 is taller than it is wide. This is required to fit the particular connector for which it is designed. The connector and adapter 54 are known parts.

Figure 8:
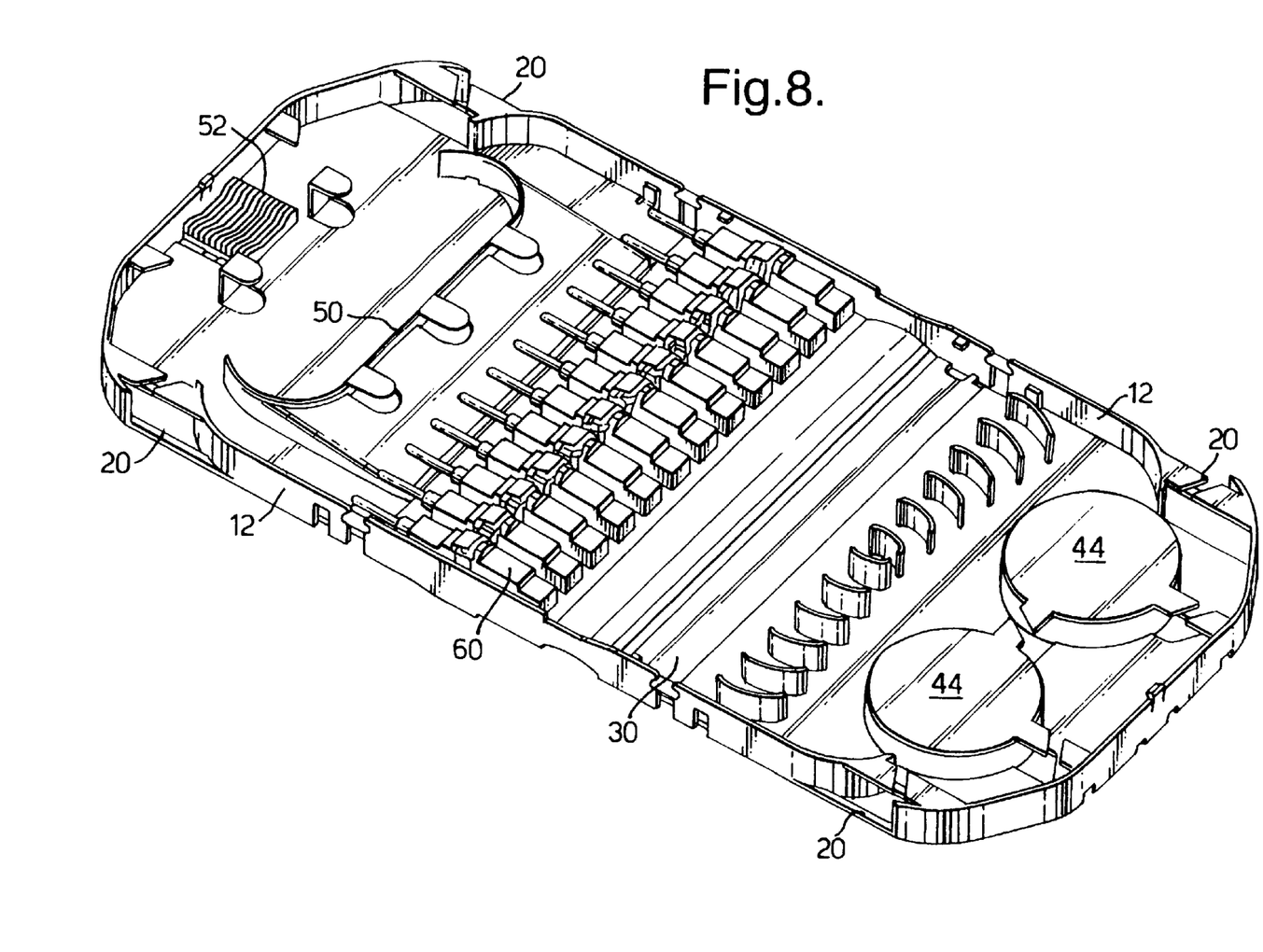
FIG. 8 is a perspective view, showing the modular components of FIGS. 3 to 5, incorporating the adapter of FIGS. 6 and 7, assembled together.

FIG. 8 shows the modules of FIGS. 3 to 5 fitted together, and the adapter of FIG. 6 and 7 in place. In addition twelve connectors have been positioned in their retaining means, within the adapters 54. As can be seen the orientation of the adapter 54, so that its longer dimension is perpendicular to the plane of the panel means that it is possible to fit twelve connectors 60 across from the rear to the front of the panel 4. The additional height of the retaining means and adapter 54, above the level of the lip 12 surrounding each panel, is accommodated by arranging for it to project into the opening in the neighbouring panel.

As in the embodiment of FIGS. 1 and 2, in the modular embodiment, all panel main body modules are preferably substantially identical, with alternate panels being rotated by 180° relative to each other.

Embodiments according to the invention may be used for patching pigtails to pigtails, pigtails to ribbon fan-out, etc. Splicing capability may also be added to the patch panel. With a modular design this may be achieved simply with an add on piece as illustrated above with reference to FIG. 5.

As explained above, the present invention may be used to increase capacity without increasing size. Typically the height of a stack of six panels, each containing twelve connectors, is about 110 mm.

What is claimed is:

1. A kit for forming an optical fiber assembly, the kit comprising:
    a plurality of panels to be stacked together including a base panel and at least one further panel, each panel comprising
        a body with an opening therein,
        an edge extending upwards from said body, and a plurality of connector-retainers carried by said body and extending beyond said edge for securing optical fiber connectors therein; and a stacking member arranged for stacking said plurality of panels together so that said plurality of connector-retainers in a respective panel project into the opening in an adjacent panel while allowing the adjacent panel to rest on said edge of the respective panel.

2. A kit according to claim 1, further comprising a plurality of fiber optic connectors retained by said plurality of connector-retainers.

3. A kit according to claim 2, wherein a portion of said plurality of fiber optic connectors in a respective panel project into the opening of an adjacent panel when stacked together.

4. A kit according to claim 1, wherein said plurality of connector-retainers comprises a plurality of projections projecting upwards from said body of each panel.

5. A kit according to claim 4, wherein said plurality of connector-retainers comprises an adapter which fits between said plurality of projections.

6. A kit according to claim 5, wherein said adapter is configured as a double open-ended box having a rectangular cross-section, said adapter being arranged so that its longer dimension, in cross-section, extends substantially perpendicular to a bottom plane of a respective panel.

7. A kit according to claim 1, wherein each panel is substantially rectilinear, and said body includes front and rear edges with said edge extending upwards from said body between the front and rear edges; and wherein said plurality of connector-retainers extend across each panel from the rear edge to the front edge in a substantially straight line.

8. A kit according to claim 1, wherein each panel is formed by a plurality of modular parts.

9. A kit according to claim 1, wherein each panel is substantially identical, and alternate panels are arranged relative to each other in a position rotated 180 degrees so that said plurality of connector-retainers in each panel are offset laterally relative to said plurality of connector-retainers in an adjacent panel.

10. A kit according to claim 1, wherein the opening in a respective panel is offset laterally relative to the opening in an adjacent panel.

11. A kit according to claim 1, wherein each panel comprises interlocking parts for interlocking with said stacking member.

12. An optical fiber assembly comprising:
a plurality of panels stacked together including a base panel and at least one further panel, each panel comprising
a body with an opening therein,
an edge extending upwards from said body, and
a plurality of connector-retainers carried by said body and extending beyond said edge for securing optical fiber connectors therein; and
a stacking member arranged for stacking said plurality of panels together so that said plurality of connector-retainers in a respective panel project into the opening in an adjacent panel while allowing the adjacent panel to rest on said edge of the respective panel.

13. An optical fiber assembly according to claim 12, further comprising a plurality of fiber optic connectors retained by said plurality of connector-retainers.

14. An optical fiber assembly according to claim 13, wherein a portion of said plurality of fiber optic connectors in a respective panel project into the opening of an adjacent panel.

15. An optical fiber assembly according to claim 12, wherein said plurality of connector-retainers comprises a plurality of projections projecting upwards from said body of each panel.

16. An optical fiber assembly according to claim 15, wherein said plurality of connector-retainers comprises an adapter which fits between said plurality of projections.

17. An optical fiber assembly according to claim 16, wherein said adapter is configured as a double open-ended box having a rectangular cross-section, said adapter being arranged so that its longer dimension, in cross-section, extends substantially perpendicularly to a bottom plane of a respective panel.

18. An optical fiber assembly according to claim 12, wherein each panel is substantially rectilinear, and said body includes front and rear edges with said edge extending upwards from said body between the front and rear edges; and wherein said plurality of connector-retainers extend across each panel from the rear edge to the front edge in a substantially straight line.

19. An optical fiber assembly according to claim 12, wherein each panel is formed by a plurality of modular parts.

20. An optical fiber assembly according to claim 12, wherein each panel is substantially identical, and alternate panels are arranged relative to each other in a position rotated 180 degrees so that said plurality of connector-retainers in each panel are offset laterally relative to said plurality of connector-retainers in an adjacent panel.

21. An optical fiber assembly according to claim 12, wherein the opening in a respective panel is offset laterally relative to the opening in an adjacent panel.

22. An optical fiber assembly according to claim 12, wherein each panel comprises interlocking parts for interlocking with said stacking member.

23. A method for forming an optical fiber assembly comprising:
providing a plurality of panels including a base panel and at least one further panel, each panel comprising
a body with an opening therein,
an edge extending upwards from the body, and
a plurality of connector-retainers carried by the body and extending beyond the edge for securing optical fiber connectors therein; and
stacking the plurality of panels together so that the plurality of connector-retainers in a respective panel project into the opening in an adjacent panel while allowing the adjacent panel to rest on the edge of the respective panel.

24. A method according to claim 23, wherein each panel is substantially identical, and stacking comprises rotating alternate panels 180 degrees relative to an adjacent panel so that the plurality of connector-retainers in each panel are offset laterally relative to the plurality of connector-retainers in the adjacent panel.

25. A method according to claim 23, further comprising inserting a plurality of fiber optic connectors into the plurality of connector-retainers.

26. A method according to claim 25, wherein a portion of the plurality of fiber optic connectors project into the opening of an adjacent panel when stacked together.

27. A method according to claim 23, wherein each panel comprises a lip on which an adjacent panel can rest, and wherein the plurality of connector-retainers in each panel project above a height of the respective lip.

* * * * *